United States Patent
Fong et al.

(10) Patent No.: US 7,927,094 B2
(45) Date of Patent: Apr. 19, 2011

(54) COMPOSITE NOZZLE CAP

(75) Inventors: Gary Fong, North York (CA); Mihai Berceanu, Thornhill (CA)

(73) Assignee: Stackteck Systems Limited, Brampton (CA)

( * ) Notice: Subject to any disclaimer, the term of this patent is extended or adjusted under 35 U.S.C. 154(b) by 328 days.

(21) Appl. No.: 11/733,267

(22) Filed: Apr. 10, 2007

(65) Prior Publication Data
US 2007/0243285 A1 Oct. 18, 2007

(30) Foreign Application Priority Data
Apr. 10, 2006 (CA) .................................... 2543057

(51) Int. Cl.
B29C 45/20 (2006.01)
(52) U.S. Cl. .................... 425/549; 264/328.15; 425/566
(58) Field of Classification Search .......... 425/562–566, 425/549, 192 R; 264/328.15, 328.9
See application file for complete search history.

(56) References Cited

U.S. PATENT DOCUMENTS

| | | | | | |
|---|---|---|---|---|---|
| 4,268,240 | A | * | 5/1981 | Rees et al. ..................... 425/548 |
| 4,312,630 | A | * | 1/1982 | Travaglini ..................... 425/568 |
| 4,330,700 | A | * | 5/1982 | Jagieniak et al. .......... 219/121.5 |
| 4,585,921 | A | * | 4/1986 | Wilkins et al. ........... 219/121.54 |
| 4,917,594 | A | * | 4/1990 | Gellert et al. ................... 425/549 |
| 4,929,811 | A | * | 5/1990 | Blankenship ............ 219/121.54 |
| 5,208,052 | A | * | 5/1993 | Schmidt et al. ............... 425/549 |
| 5,334,010 | A | * | 8/1994 | Teng ............................. 425/563 |
| 5,518,393 | A | * | 5/1996 | Gessner ........................ 425/549 |
| 5,895,669 | A | * | 4/1999 | Seres et al. ................... 425/549 |
| 6,022,210 | A | * | 2/2000 | Gunther ........................ 425/549 |
| 6,086,356 | A | * | 7/2000 | Yu ................................. 425/564 |
| 6,245,278 | B1 | * | 6/2001 | Lausenhammer et al. . 264/328.1 |
| 6,709,262 | B2 | * | 3/2004 | Fong ............................. 425/549 |
| 6,960,073 | B2 | * | 11/2005 | Bazzo et al. .................. 425/549 |
| 7,165,965 | B2 | * | 1/2007 | Olaru ............................ 425/549 |
| 7,244,118 | B2 | * | 7/2007 | Olaru ............................ 425/568 |
| 7,361,010 | B2 | * | 4/2008 | Adas et al. .................... 425/549 |
| 7,559,760 | B2 | * | 7/2009 | Tabassi et al. ................ 425/549 |
| 2002/0009516 | A1 | * | 1/2002 | Jenko ............................ 425/549 |
| 2002/0121713 | A1 | * | 9/2002 | Moss et al. .................... 264/40.7 |
| 2004/0146598 | A1 | * | 7/2004 | Sicilia et al. .................. 425/569 |
| 2004/0191355 | A1 | * | 9/2004 | Babin et al. ................... 425/549 |
| 2004/0208949 | A1 | * | 10/2004 | Niewels ........................ 425/549 |
| 2004/0224046 | A1 | * | 11/2004 | Babin ........................ 425/192 R |
| 2006/0018993 | A1 | * | 1/2006 | Fairy ............................. 425/564 |
| 2006/0159799 | A1 | * | 7/2006 | Trakas ........................... 425/564 |

* cited by examiner

Primary Examiner — Joseph S Del Sole
Assistant Examiner — Dimple Bodawala
(74) Attorney, Agent, or Firm — Pearne & Gordon LLP

(57) ABSTRACT

The present invention provides a composite nozzle cap having a first part made of metal and an outer tip of a polymeric material. The first part mechanically secures the nozzle into the nozzle housing by engaging the nozzle housing and pressing against a base flange on the nozzle to clamp the flange between the first part of the nozzle housing. The second part extends away from the nozzle housing and is mechanically secured to the first part. An inner face of the second part contacts the nozzle tip to prevent melt flow between the second part of the nozzle tip. An outer face of the second part contacts the gate insert to avoid melt flow between the second part and the gate insert. As the second part is of a polymeric material, it avoids the heat transfer concerns associated with a metallic interface between the nozzle tip and the gate insert.

5 Claims, 1 Drawing Sheet

COMPOSITE NOZZLE CAP

FIELD OF THE INVENTION

This invention relates generally to the injection molding of plastics utilizing hot runner systems. More particularly, this invention relates to injection molding nozzle tip assemblies and the configuration of such assemblies to minimize colour bleeding when changing from one coloured resin to another.

BACKGROUND OF THE INVENTION

A conventional hot runner system for the injection molding of "plastics" (thermoplastic polymers) utilizes an injection nozzle or an array of such nozzles to force or "inject" molten resin ("melt") into a void defined between core and cavity parts of a mold. Each nozzle is made up of a nozzle body or housing and a nozzle tip secured to a "tip end" of the housing either by direct threaded engagement or through the use of a "nozzle cap". A conventional nozzle cap is a ring which fits over the nozzle tip, engages a flange at the base of the nozzle tip and threadedly engages the tip end of the nozzle housing.

The housing and the tip have generally axially extending passages therethrough which register with one another to define a melt passage along which the melt flows during injection. The tip may have one or more outlets at its end depending on the flow pattern required for the mold arrangement being used. In some cases the tip would have a single outlet axially aligned with the melt passage which may be blocked and opened by a valve pin extending along the melt passage and through a base of the nozzle housing. Alternatively, melt flow at the tip may be controlled through "sprue gating" according to which solidification of a portion of the melt in the tip is used to interrupt melt flow. The nozzle tip may be received in a "gate insert". The gate insert forms the gate portion of a mold, which is that portion through which melt enters the mold.

The resin must be maintained in its molten state as melt until the mold is filled. As a gate insert and its surrounding mold part represent a large heat sink, and the nozzle tip is traditionally of metal (which conducts heat well), prior practice has been to avoid direct contact between the nozzle tip and the gate insert. This has been achieved in various ways in the past. One way to avoid direct contact between the nozzle tip and the get insert is to provide a "gap" or "void" between the outer end of the nozzle tip and the gate insert. Initially the gate would be filled with air but later would fill with resin which seeps in during molding. A disadvantage to such an arrangement occurs during changeover from resin of a first colour to resin of another colour. Trapped resin continues to "bleed" into the new resin producing unacceptable streaking and requiring a lengthy changeover and many wasted parts before changeover is fully established.

Another solution to the problem of bleeding is to fill the void between the gate insert and the nozzle tip with an insert sometimes called a "gate well insulator". The insulator is a machined insert of an insulating material such as a ceramic such as for example sold under the "Vespel" brand, which occupies the void in which resin would otherwise collect. This approach has disadvantages which include an expensive base material, difficulty in matching the insulator to the gate inserts and the tips, cracking of the insulator after a short period of use and sticking of the insulators to the gate insert when the mold is opened for cleaning.

Another solution has been proposed in my earlier U.S. Pat. No. 6,709,262 B2 pursuant to which a nozzle cap is provided which is machined to very close tolerances to provide a gap between the nozzle tip and the gate insert large enough to avoid conductive heat transfer yet small enough to prevent melt flow. Heat loss may still prove problematic in this approach in some applications.

SUMMARY OF THE INVENTION

In very general terms, the present invention provides a composite nozzle cap having a first part made of metal and an outer tip of a polymeric material. The first part mechanically secures the nozzle into the nozzle housing by engaging the nozzle housing and pressing against a base flange on the nozzle to clamp the flange between the first part of the nozzle housing. The second part extends away from the nozzle housing and is mechanically secured to the first part. An inner face of the second part contacts the nozzle tip to prevent melt flow between the second part of the nozzle tip. An outer face of the second part contacts the gate insert to avoid melt flow between the second part and the gate insert. As the second part is of a polymeric material, it avoids the heat transfer concerns associated with a metallic interface between the nozzle tip and the gate insert.

More particularly, the invention provides a nozzle cap for securing an injection molding nozzle tip to a nozzle housing and extending into a gate insert, the nozzle tip having an inner end opposite an outer end with the inner end having a securing flange extending radially outwardly thereabout for clamping securement between the nozzle cap and the nozzle housing. The nozzle cap has a first part having a housing end opposite a connector end with a passage therethrough for receiving the nozzle tip. The housing end is dimensioned to engage the base flange and the first part has a threaded portion for threadedly engaging the nozzle housing for the clamping securement. The nozzle cap has a second part secured at a first end to the first part and having a recess for receiving the nozzle tip. The second part has a tip end opposite the first end with an outlet passage therethrough for registering with the melt outlet of the nozzle tip to pass melt emerging from the melt outlet. The tip end of the second part is dimensioned to sealingly engage the outer end of the nozzle tip and the gate insert to avoid melt flow between the tip and the outer end of the nozzle and between the tip and the gate insert. The tip portion is of a thermoplastic polymer usable at a selected operating temperature of the nozzle tip.

The nozzle cap may further have interactive engagement means acting between the first part and the second part to mechanically secure the second part to the first part.

The first end of the second part may be insertable into the passage at the connector end of the first part. The interactive engagement means may be at least one protrusion on either the first or second part which is received in at least one corresponding recess on the other of the first and second parts.

The protrusion(s) may extend radially outwardly from the second part adjacent the first end of the second part. The recess(es) may extend radially outwardly from the passage into the first part adjacent to the connector end. The protrusion(s) may have a tapered guide surface for guiding the protrusion(s) into and along the passage to the recess as the second part is inserted into the first part by resiliently deforming the first end of the second part radially inwardly in response to the insertion.

The second part may be a molded thermoplastic polymer.

DESCRIPTION OF DRAWINGS

Preferred embodiments of the present invention are described below with reference to the accompanying illustration in which.

DESCRIPTION OF PREFERRED EMBODIMENTS

Figure 1:
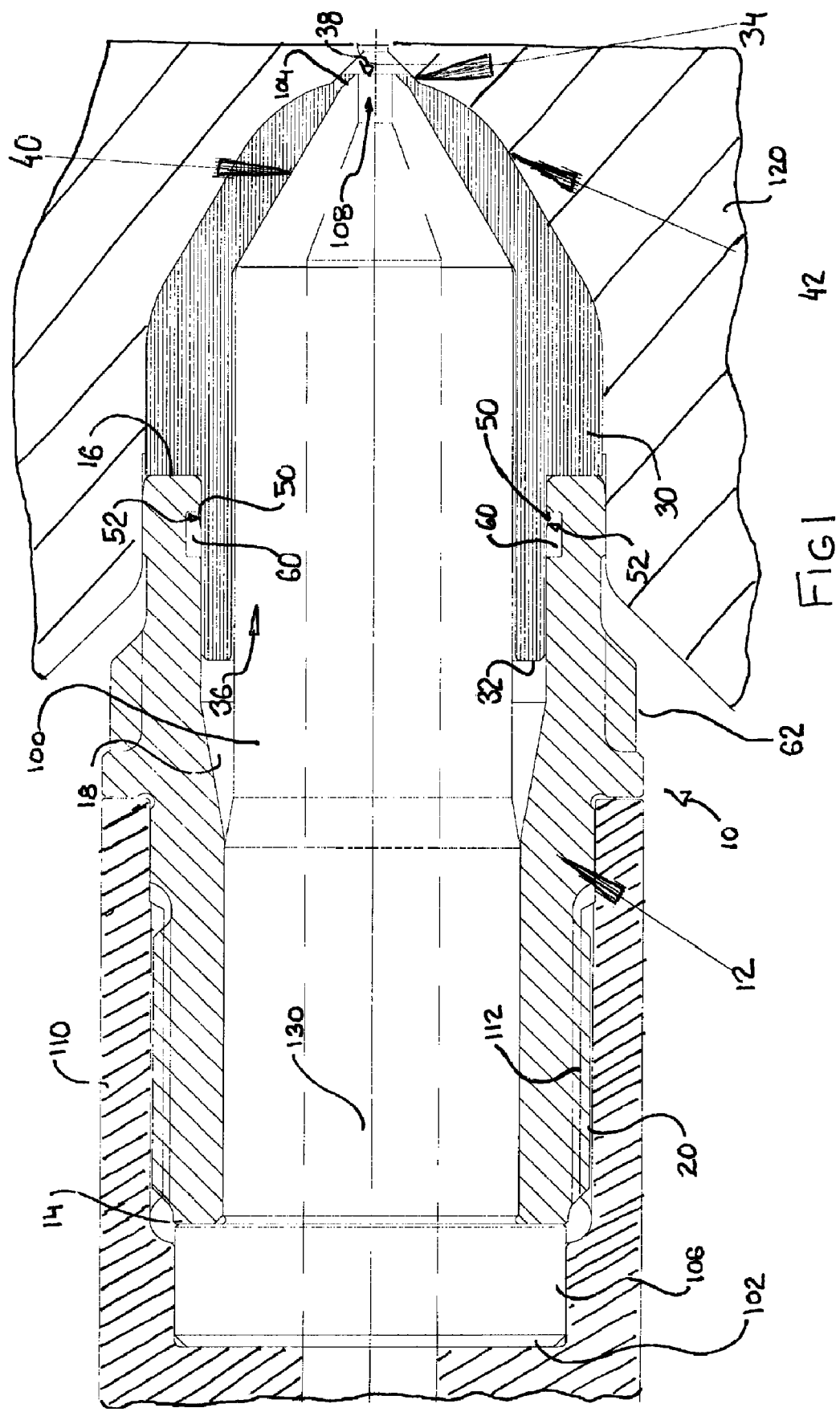
FIG. 1 is an axial sectional view illustrating a nozzle cap according to the present invention mounted over a nozzle tip (not sectioned) and secured to a nozzle housing, a forward end of which is illustrated in axial section.

A nozzle cap according to the present invention is generally illustrated by reference 10. The nozzle cap end secures a nozzle tip 100 to a nozzle housing 110. The nozzle tip 100 extends into a gate insert 120. The nozzle tip 100 has an inner end 102 opposite an outer end 104. The inner end has a securing flange 106 extending radially outwardly thereabout. The nozzle tip 100 is clampingly secured between the nozzle cap 12 and the nozzle housing 110.

The nozzle cap 10 has a first part 12 having a housing end 14 opposite a connector end 16. A passage 18 extends through the first part 12 of the nozzle cap 10 for receiving the nozzle tip 100. The housing end 14 is dimensioned to engage the flange 106. The first part 12 further has a threaded portion 20 comprising outwardly extending threads for threadedly engaging corresponding threads 112 of the nozzle housing 110 for the aforementioned clamping securement.

The nozzle cap 10 has a second part 30 secured at a first end 32 to the first part 12 adjacent the connector end 16 and the first part 12. The second part 30 has a recess 36 for receiving the nozzle tip 100. The second part 30 has a tip end 34 opposite the first end 32 with an outlet passage 38 extending therethrough for registering with a melt outlet 108 of the nozzle tip to pass melt emerging from the melt outlet 108.

The tip end 34 of the second part 30 is dimensioned to sealingly engage the outer end of the nozzle tip as shown at reference 40 to avoid (prevent) melt flow between the tip end 34 and the outer end 104 of the nozzle 100. The tip end 34 is further dimensioned to sealingly engage the gate insert 120 as illustrated at reference 42 to avoid (prevent) melt flow between the tip end 34 and the gate insert 120.

The first part 12 of the nozzle cap 10 may be of a conventional metallic material to provide good machineability and adequate strength to securely clamp the nozzle tip 100 into the nozzle housing 110. Furthermore, using a metallic material for the first part 12 may be desirable in order to promote heat transfer between the nozzle housing 110 and the nozzle tip 100 to maintain any melt in the nozzle tip in a molten state. Titanium is sometimes used because of its beneficial heat transfer properties.

The second part 30 should be of a non-metallic material to avoid heat transfer between the gate insert 120 and the nozzle tip 100 to avoid freezing of melt in the region of the outer end 104 of the nozzle tip 100. It has been found that a thermoplastic polymer material may be used as long as the particular thermoplastic selected will remain sufficiently rigid under the operating conditions to avoid deformation by having the second part 30 soften or melt during use. The thermoplastic polymer selected will depend on the desired selected operating temperature for the nozzle tip and may vary depending on the particular resin being molded.

The nozzle cap 10 may be adapted to either a sprue gated or valve gated design. A typical valve pin 130 is shown in dashed outline by way of illustration. The valve pin 130 would be omitted in a sprue gated design and furthermore a sprue gated design may have more than one melt outlet 108 depending on further mold design parameters.

In order to secure the second part 30 to the first part 12, interactive engagement means may be provided such as a protrusion 50 extending radially outwardly from the second part 30 adjacent the first end 32 which is received in a recess 60 extending radially outwardly from the passage 18 into the first part 12 adjacent its connector end 16.

It will be appreciated by persons skilled in the art that the illustrated arrangement is but one possible configuration. It may for example be possible to provide a protrusion on the first part 12 and a recess in the second part 30 for receiving the protrusion. Furthermore, the recess 60 may be segmented rather than continuous, in which case there would be more than one protrusion. Similarly, the protrusion 50 may be segmented or continuous. Threaded or other engagement might also be contemplated however the illustrated arrangement may be more conducive to molding of the second part 30.

The protrusion 50 may be provided with a tapered surface 52 for guiding the protrusion into and along the passage 18 to the recess 60 as the first end 32 of the second part 30 is inserted into the connector end 16 of the first part 12. The tapered surface 52 acts as a cam surface to cause resilient deformation of an adjoining area of the second part 30 radially inwardly until the recess 60 is reached. At that point, restoration of the deformed area would cause the protrusion 50 to enter the recess 60.

The nozzle cap 10 may be provided with hexagonally disposed flats 62 or other suitable contours to provide a gripping surface for a wrench or other installation tool.

The above description is intended in an illustrative rather than a restrictive sense. Variations to the exact embodiments described may be apparent to persons skilled in such structures without departing from the underlying invention as defined by the claims set out below.

PARTS LIST

10 nozzle cap
12 first part
14 housing end
16 connector end
18 passage
20 threaded portion
30 second part
32 first end
34 tip end
36 recess
38 outlet passage
40 seal tip-cap
42 seal tip-gate insert
50 protrusion
52 tapered surface
60 recess
62 flats
100 nozzle tip
102 inner end
106 flange
108 melt outlet
110 nozzle housing
112 threads
120 gate insert
130 valve pin

The invention claimed is:

1. A nozzle cap for securing an injection molding nozzle tip to a nozzle housing and extending into a gate insert, said nozzle tip having an inner end opposite an outer end, said inner end having a securing flange extending radially outwardly thereabout, for clamping securement between said nozzle cap and said nozzle housing, said nozzle cap comprising:

a first part having a housing end opposite a connector end with a passage therethrough for receiving said nozzle tip, said housing end being dimensioned to engage said securing flange, said first part having a threaded portion for threadedly engaging said nozzle housing for said clamping securement;

a second part secured at a first end to said connector end of said first part and having a recess for receiving said nozzle tip, said second part having a tip end opposite said first end with an outlet passage therethrough for registering with a melt outlet of said nozzle tip to pass melt emerging from said melt outlet;

said tip end of said second part being dimensioned to sealingly engage said outer end of said nozzle tip and said gate insert such that there is no space between said tip end and said nozzle tip and between said tip end and said gate insert in order to prevent melt flow between said tip end and said outer end of said nozzle tip and between said tip end and said gate insert;

said second part being of a thermoplastic polymer useable at a selected operating temperature of said nozzle tip.

2. The nozzle cap of claim 1 further comprising interactive engagement means acting between said first part and said second part to mechanically secure said second part to said first part.

3. The nozzle cap of claim 2 wherein:
said first end of said second part is insertable into said passage at said connector end;
said interactive engagement means is at least one protrusion on one of said first and second parts which is received in at least one recess on the other of said first and second parts.

4. The nozzle cap of claim 3 wherein:
said at least one protrusion extends radially outwardly from said second part adjacent said first end;
said at least one recess extends radially outwardly from said passage into said first part adjacent said connector end;
said at least one protrusion has a tapered guide surface for guiding said protrusion into and along said passage to said recess, as said second part is inserted into said first part, by resiliently deforming an adjoining area of said second part radially inwardly in response to said insertion.

5. The nozzle cap of claim 4 wherein:
said second part is a molded thermoplastic polymer.

\* \* \* \* \*